United States Patent
Gu

[11] Patent Number: 6,157,426
[45] Date of Patent: Dec. 5, 2000

[54] LIQUID CRYSTAL DISPLAY WITH $SIO_xN_Y$ INCLUSIVE MULTILAYER BLACK MATRIX

[75] Inventor: Tieer Gu, Troy, Mich.

[73] Assignee: OIS Optical Imaging Systems, Inc., Northville, Mich.

[21] Appl. No.: 09/023,451

[22] Filed: Feb. 13, 1998

[51] Int. Cl.[7] .................................................. G02F 1/1333
[52] U.S. Cl. ............................ 349/111; 349/110; 257/72
[58] Field of Search .................................. 349/110, 111, 349/137; 257/72

[56] References Cited

U.S. PATENT DOCUMENTS

| | | |
|---|---|---|
| 5,414,547 | 5/1995 | Matsuo et al. . |
| 5,414,574 | 5/1995 | Matsuo et al. ............................. 359/67 |
| 5,419,991 | 5/1995 | Segawa . |
| 5,453,857 | 9/1995 | Takahara .................................... 359/57 |
| 5,532,180 | 7/1996 | Den Boer et al. ......................... 437/40 |
| 5,539,219 | 7/1996 | Den Boer et al. ......................... 257/72 |
| 5,570,212 | 10/1996 | Seigerwald ................................. 359/67 |
| 5,641,974 | 6/1997 | den Boer et al. . |
| 5,666,177 | 9/1997 | Hsieh et al. . |
| 5,682,211 | 10/1997 | Yao et al. . |
| 5,714,286 | 2/1998 | Uchikawa et al. . |
| 5,808,714 | 9/1998 | Rowlands et al. ....................... 349/110 |
| 5,818,550 | 10/1998 | Kadota et al. . |
| 5,859,853 | 1/1999 | Konuma et al. ........................... 349/42 |
| 6,038,002 | 3/2000 | Song ........................................... 349/43 |
| 6,043,857 | 3/2000 | Kurauchi et al. ....................... 349/106 |
| 6,069,678 | 5/2000 | Sakamoto et al. ...................... 349/141 |

OTHER PUBLICATIONS

"A High–Aperture–Ratio TFT–LCD With A Shield–Electrode Structure" by Ueda, et al., SID 93 Digest, pp. 739–741.

*Primary Examiner*—Kenneth Parker
*Assistant Examiner*—Mike Qi
*Attorney, Agent, or Firm*—Laff, Whitesel & Saret, Ltd.

[57] ABSTRACT

A liquid crystal display (LCD) includes a multilayer black matrix system for improving the contrast of displayed images. The black matrix system includes at least one layer of a material that has variable amounts of chemical elements. By, for example, varying "x" and "y" in $SiO_xN_y$, the refractive index "n" of adjacent $SiO_xN_y$ layers can be slowly varied through the thickness of the system so that the refractive index adjacent the substrate substantially matches that of the substrate and so that there are no overly large refractive index differences between adjacent layers in the system. This reduces light reflections off of the black matrix system.

22 Claims, 2 Drawing Sheets

LIQUID CRYSTAL DISPLAY WITH SiO$_X$N$_Y$ INCLUSIVE MULTILAYER BLACK MATRIX

This application relates to a liquid crystal display (LCD) including a black matrix. More particulary, this application relates to a liquid crystal display including a multilayer black matrix portion that includes at least one layer of silicon oxynitride.

BACKGROUND OF THE INVENTION

Liquid crystal displays (LCDs) including black matrices are known in the art. For example, see U.S. Pat. Nos. 5,666,177; 5,682,211; and 5,641,974, the disclosures of which are hereby incorporated herein by reference.

The purpose of black matrices in LCDS is to block light that is extraneous to the display or pixels thereof that would otherwise emerge on the viewing side of the display, and reduce overall contrast. Thus, in order to achieve satisfactory contrast in high ambient light conditions in LCDs, black matrices (BMs) are provided, and must be able to absorb and reflect light. Black matrices are often located on the color filter substrate and function to prevent ambient light surrounding the display from reducing display contrast, and to efficiently do this, reflection of light off of the black matrix must be kept to a minimum. A number of materials have been conventionally used for black matrix applications, include CrO$_x$ and Cr combinations, black polymer, black polyimide, SiO$_x$ and Si combinations, and Si-rich SiN$_x$.

Unfortunately, conventional black matrix materials discussed above suffer from at least the following problems: (1) reflection is not low enough for certain display applications (e.g. CrO$_x$/Cr, black polymer or polyimide, Si-rich SiN$_x$) as these materials provide reflection of light in the range of from about 1.5 to 7.0% (i.e. this is too high of a reflection for certain LCD applications); (2) some of these materials experience difficulties in patterning and/or etching (e.g. polyimide, CrO$_x$/Cr); and/or (3) they are very expensive (e.g. e-beam evaporated SiO$_x$/Si from Optical Coating Lab., Inc.).

It has been found that for low reflection to be achieved, it is desirable to substantially match indices of refraction between black matrix layers at least at interfaces defined thereby with the substrate upon which they are provided. Silicon dioxide has an index of refraction substantially matched (i.e. very close) to glass, however, its index does not substantially match with a-Si film which is typically used with silicon dioxide in black matric applications. Also, PECVD silicon nitride typically has a refractive index between 1.8 and 2.2, and it thus does not always substantially match with glass (glass has a refractive index of about 1.5). These, of course, are problematic, as lack of proximity of adjacent refractive indices can cause reflection.

It is apparent from the above that there exists a need in the art for an improved black matrix system/material, and method of making same, for display (e.g. LCD) applications. It would be desired if improved reflectivity characteristics and/or manufacturability could be achieved.

It is a purpose of this invention to fulfill the above-described needs in the art, as well as other needs which will become apparent to the skilled artisan from the following detailed description of this invention.

SUMMARY OF THE INVENTION

It is an object of this invention to provide a black matrix which reflects less light, including less visible light rays.

Another object of this invention is to provide a multilayer black matrix, for use in display applications, that includes at least one silicon oxynitride layer (SiO$_x$N$_y$)

Another object of this invention is to provide a black matrix whose refractive index is adjustable or changeable at certain areas thereof between values of from about 1.5 and 4.5 by varying x and y of a layer(s), e.g. SiO$_x$N$_y$. This can be done, for example, by changing gas ratios of SiH$_4$/NH$_3$/N$_2$O/H$_2$/N$_2$/O$_2$ (all of these gases or any combination thereof) in a PECVD deposition process and utilizing SiO$_x$N$_y$ as a layer(s) in a black matrix system.

It is another object of this invention to provide a black matrix whose absorption coefficient can be varied with changing x and/or y in a layer of the black matrix material layer(s).

It is still another object of this invention to provide a black matrix material that can be etched in plasma.

It is another object of this invention to provide a black matrix material having more than one parameter (i.e. x, y, and/or z) that can be varied.

Yet another object of this invention is to provide a multilayer black matrix with either abrupt interface (e.g. SiO$_{x1}$N$_{y1}$/SiO$_{x2}$N$_{y2}$/ . . . /SiO$_{xn}$N$_{yn}$) or a gradual interface (e.g. SiO$_{x(t)}$N$_{y(t)}$) that can be deposited. Abrupt interface multilayer black matrix systems can be deposited by turning off RF power while gas ratio(s) are changed, while a gradual interface black matrix layer system can be formed with RF power on while simultaneously changing gas ratio. In gradual embodiments, "x" and "y" values of SiO$_x$N$_y$ or the like are functions of time at certain layer locations, and in certain further embodiments each SiO$_x$N$_y$ layer has at least one portion (near an interface with an adjacent layer) where "x" and/or "y" are functions of time and another portion (near the center of the layer) where "x" and/or "y" are substantially constant.

Generally speaking, this invention may fulfill the above described needs in the art by providing a liquid crystal display comprising:

an active substrate including a plurality of switching devices (e.g. transistors or diodes) thereon;

a passive substrate including a common electrode thereon;

a liquid crystal layer disposed between said active and passive substrates; and a black matrix system disposed on said passive substrate, said black matrix system including at least one SiO$_x$N$_y$ layer having a thickness, wherein "x" and "y" of said SiO$_x$N$_y$ each vary throughout the black matrix system.

This invention further fulfills the above described needs in the art by providing a liquid crystal display comprising:

first and second substrates;

a liquid crystal layer disposed between said first and second substrates;

a black matrix system disposed on one of said first and second substrates, so that an interface is defined between said black matrix system and said one of said first and second substrates;

said black matrix system reflecting less than about 1.0% of visible ambient light rays (e.g. between 380–760 nm) which impinge thereon from the direction of the viewer (i.e. which hit the black matrix);

said black matrix system having a first index of refraction of from about 1.5 to 1.7 immediately adjacent said interface, and said substrate having a second index of refraction of from about 1.4 to 1.6 immediately adjacent said interface; and wherein said black matrix system includes a material having at least two parameters that vary in said black matrix system in order to vary the index of refraction of said material in said black matrix system.

This invention will now be described with reference to certain embodiments thereof as illustrated in the following drawings.

IN THE DRAWINGS

DETAILED DESCRIPTION OF CERTAIN EMBODIMENTS OF THIS INVENTION

Figure 1:
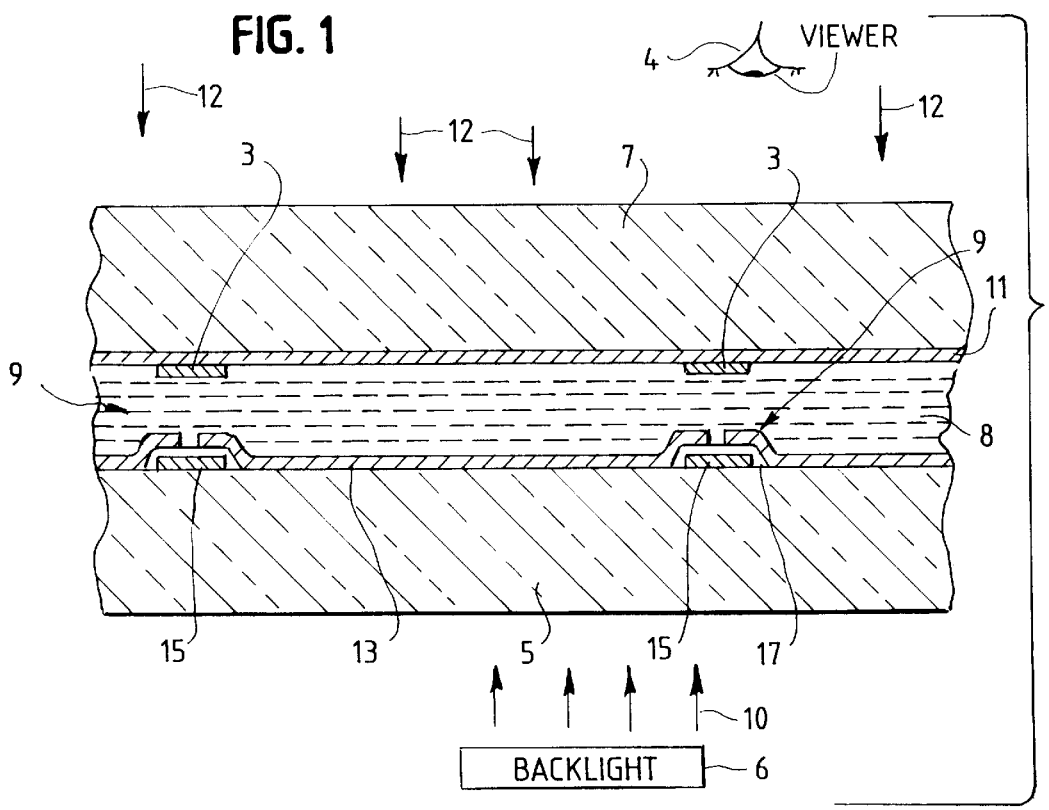
FIG. 1 is a side cross sectional view of a liquid crystal display (LCD) including a plurality of pixels according to an embodiment of this invention utilizing a black matrix system according to an embodiment of this invention.

Referring now more particularly to the accompanying drawings in which like reference numerals indicate like parts throughout the several views.

FIG. 1 is a side cross sectional view of an LCD including black matrix system 3 according to an embodiment of this invention. The LCD includes substantially transparent active matrix substrate 5 (e.g. glass or plastic), substantially transparent passive or color filter substrate 7 (e.g. of glass or plastic), twisted nematic liquid crystal layer 8 sandwiched between the two substrates, and switching thin film transistors (TFTs) 9 provided on active substrate 5. The "active" substrate is the substrate which has the switching devices (e.g. TFTs 9 or diodes) provided thereon. Each TFT includes gate electrode 15, a-Si semiconductor layer 17, and a source and drain electrode as known in the art. Passive substrate 7 (e.g. color filter substrate in color LCD applications) includes thereon common electrode 11 and the numerous segments making up black (or opaque) matrix system 3. Common electrode 11 and pixel electrodes 13 (each one of which is in electrical communication with a TFT 9) are both substantially transparent (e.g. of indium-tin-oxide or ITO) and sandwich liquid crystal layer 8 therebetween so that the application of different voltages across layer 8 by these electrodes enables the display to emit an image to a viewer in a known manner. For example, see U.S. Pat. No. 5,641,974, the disclosure of which is incorporated herein by reference. The term "substantially transparent" herein means substantially transparent to visible light wavelengths.

Figure 2:
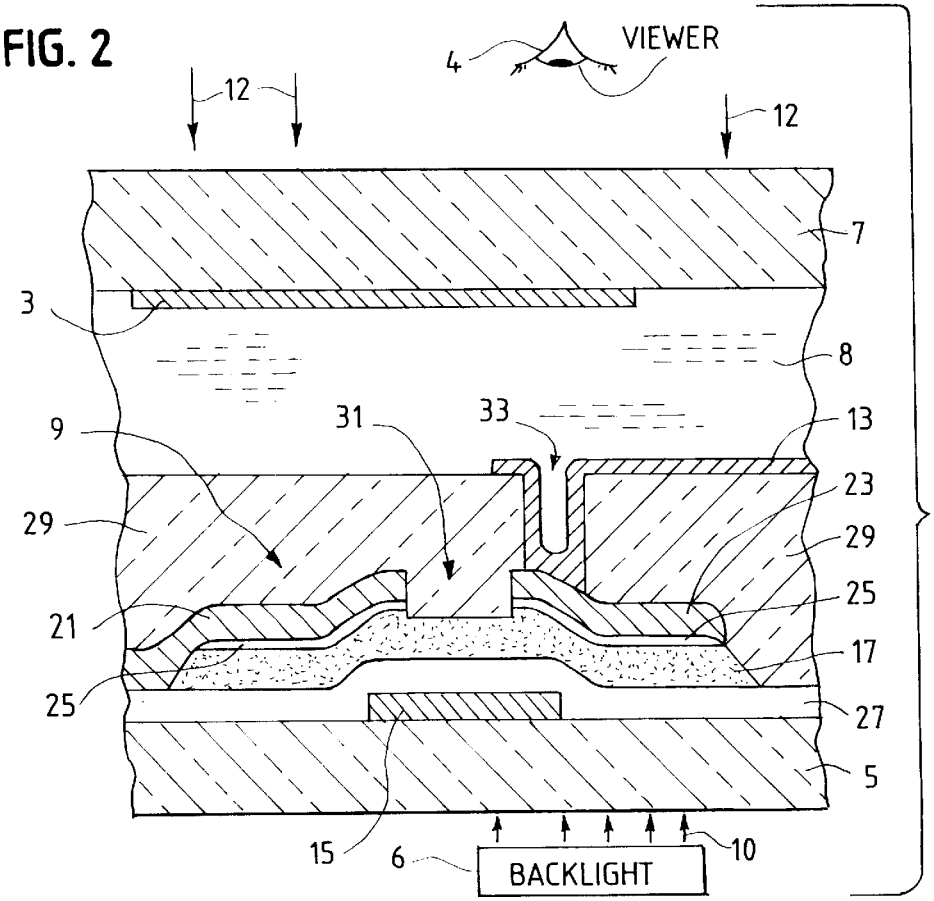
FIG. 2 is a side cross sectional view of a LCD pixel according to another embodiment of this invention utilizing a black matrix system according to this invention.

Black matrix layering system 3 is provided on the passive substrate so as to prevent ambient light (e.g. sunlight) from reaching areas between pixel electrodes 13 and reducing contrast ratios of the displayed image. The black matrix is typically located between adjacent pixels, and results in improved contrast ratios of the display. Black matrix system 3 may be mounted directly on the interior face of the passive or color filter substrate 7 as shown in FIG. 2, or alternatively may be mounted elsewhere on the interior side of the passive substrate. When mounted directly on the glass of substrate 7, the black matrix system should have, in accordance with certain embodiments of this invention, a refractive index (n) such as from about 1.5 to 1.70 that is thus matched or substantially matched to that of the substrate glass at the interface between the glass of the substrate 7 and the black matrix system. Glass has a refractive index of 1.5.

Black matrices according to different embodiments of this invention may be located at any place in the display. Thus, either the active or passive substrate can be used to support black matrices according to certain embodiments of this invention. Such black matrices may take any form on any substrate.

FIG. 2 illustrates another LCD pixel which may utilize black matrix system 3. This pixel includes active substrate 5, color filter or passive substrate 7, TFT 9, liquid crystal layer 8, TFT gate electrode 15, TFT drain electrode 21, TFT source electrode 23, a-Si semiconductor layer 17, doped a-Si contact layer 25, gate insulating layer 27 (e.g. silicon nitride or silicon oxide), substantially transparent photo-imageable organic insulating layer 29 having a dielectric constant of less than about 5.0, preferably less than about 3.5, and most preferably less than about 3.0 (layer 29 may be of photo-imageable BCB, available from Dow Chemical, or of photo-imageable Fuji Clear, available from Fuji), TFT channel 31, via or contact hole 33, and substantially transparent pixel electrode 13 (e.g. of ITO) which electrically communicates and contacts source 23 through via 33. Still referring to FIG. 2, after black matrix 3 has been formed on substrate 7, then color filters (not shown), a common electrode (not shown), and an orientation film (not shown) are provided over the black matrix in a known manner. An array of the FIG. 2 pixels is provided in a typical display so as to make up a matrix array of same. For more detail regarding the FIG. 2 display, see U.S. Pat. No. 5,641,974. Ambient light 12 impinges upon the display and the black matrix system from the direction of viewer 4.

The displays of FIGS. 1 and 2 are preferably oriented so that passive substrate 7 is closer to viewer 4 than is active substrate 5, and so that backlight 6 is thus provided on the active substrate side of the display so that light rays 10 emitted by backlight 6 pass through active substrate 5, then through liquid crystal layer 8, and then hit substrate 7. Black matrix system 3 prevents ambient light 12 from reducing contrast of the display, such ambient light being sunlight or other light coming from the viewer side of the display. The black matrix system 3 absorbs most of the ambient rays 12 and reflects few of them thereby keeping the contrast of the displayed images at acceptable levels. Preferably, the substrate upon which the black matrix is mounted is located closest to viewer 4.

Figure 3:
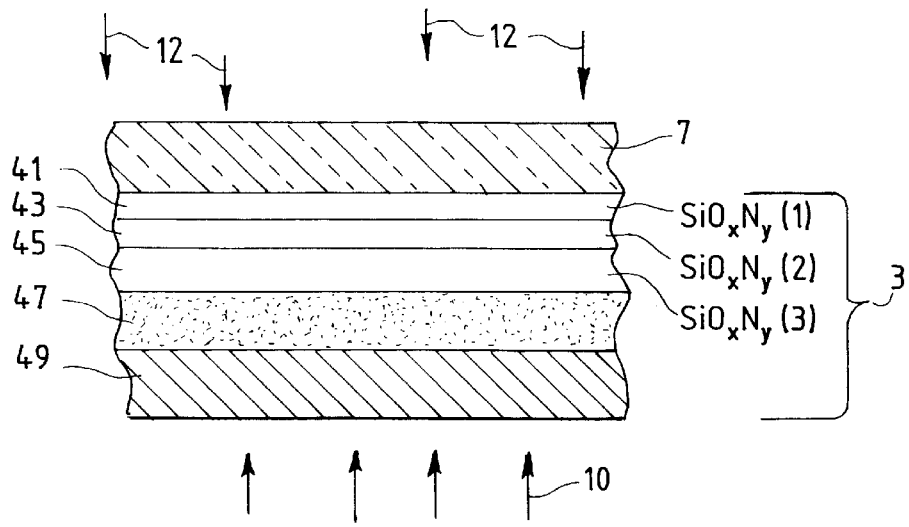
FIG. 3 is a side cross sectional view of a black matrix system according to an embodiment of this invention that can be used in either the FIG. 1 display or the FIG. 2 display.

FIG. 3 is a side cross sectional view of multilayer black matrix system 3 that may be used in either the FIG. 1 or FIG. 2 embodiment of this invention. Alternatively, black matrix system 3 may be provided on the active substrate instead of the passive substrate (especially if the active substrate is closest to the viewer), although the passive (or color filter) substrate is the preferred support for the black matrix system. The black matrix is preferably located on the interior side or surface of substrate 7 (i.e. the side closest to the liquid crystal layer). Matrix 3 is provided across substrate 7 so as to cover or correspond to TFT channel 31 areas, spaces between pixel electrodes 13 and adjacent address lines, and/or spaces between adjacent pixel electrodes 13 (i.e. in between pixels) so as to prevent unwanted light from lessening contrast of the emitted image. For example, see the black matrix locations and designs of U.S. Pat. Nos. 5,641,974; 5,682,211; 5,666,177; 5,453,857; and 5,414,547, the disclosures of which are incorporated herein by reference. Multilayer black matrix system 3 according to this invention can be used in the locations and layouts taught in any of these patents, although it is preferably located on the passive substrate (i.e. the substrate that does not include the switching devices [e.g. TFTs or diodes]).

Still referring to FIG. 3, black matrix 3 is a multilayer system. In certain embodiments, black (i.e. substantially opaque to visible light rays) matrix system 3 includes substantially transparent passive substrate 7, first 41, second 43, and third 45 $SiO_xN_y$ layers, light absorbing (e.g. a-Si semiconductor) layer 47, and opaque metal (e.g. Mo or Cr) layer 49. Over layer 49 is provided the display's color filters, common electrode, and passive substrate orientation or buffing film. Thus, black matrix system 3 is located at a position between the liquid crystal layer 8 and substrate 7. For low black matrix reflection, matrix 3 has a refractive index (n) [i.e. from about 1.5 to 1.7] adjacent substrate 7 that matches or substantially matches the index of the material (e.g. glass) of substrate 7 at the interface between the substrate and the matrix material, and the different adjacent layers of system 3 in some embodiments have indices of refraction that substantially match one another in order to reduce reflections. The gradual, as opposed to sudden, shifting of refractive indices n from substrate 7 toward metal layer 49 minimizes ambient reflections off of black matrix system 3.

Black matrix layering system 3 has at least the following advantages: (1) the refractive index of the system 3 in the silicon oxynitride areas can be varied or changed gradually between about 1.5 (glass substrate) and 4.5 by varying "x" and "y" of the $SiO_xN_y$ (silicon oxynitride) layers. The x and y parameters of the silicon oxynitride layer(s) can be varied by changing gas ratios of $SiH_4/NH_3/N_2O/H_2/N_2/O_2$ in the PECVD (plasma enhanced chemical vapor deposition) process used to deposit the silicon oxynitride layer(s) on substrate 7 although in many embodiments, $H_2$, $N_2$, and $O_2$ are not used; (2) the absorption coefficient of system 3 can also be varied by changing x and y of the silicon oxynitride layer(s); (3) for silicon oxynitride ($SiO_xN_y$) there are multiple (i.e. more than one) parameters (e.g. x and y) that can be varied, as compared to either $SiN_x$ or $SiO_x$ which only have the x parameter to vary, thereby maximizing the flexibility of design and potential efficiency of the system of this invention; (4) silicon oxynitride can be dry etched in plasma such as $CF_4/O_2$, $SF_4/O_2$, or any other known plasma thereby making it easier to manufacture; (5) silicon oxynitride portions of system 3 are multilayer in effect and thus can be formed with abrupt interface(s) ($SiO_{x1}N_{y1}/SiO_{x2}N_{y2}/\ldots/SiO_{xn}N_{yn}$) between layers 41–45, or with gradual interfaces ($SiO_{x(t)}N_{y(t)}$) between layers 41–45. In the case of abrupt interfaces, the RF power is turned off between each layer 41, 43, and 45, so that the gas ratio can be changed from layer to layer; thus, each layer 41, 43, and 45 has independent and different but substantially constant x and y values in abrupt embodiments. In the case of gradual interfaces between layer 41, 43, and 45, the RF power of the CVD apparatus remains on during deposition of the silicon oxynitride layers while the gas ratios are changed thereby resulting in a smooth transition of x and y values between layers 41–45; thus, the x and y values in the silicon oxynitride layer(s) are functions of time in gradual interface embodiments of this invention. In gradual interface embodiments, the change of x and/or y in the silicon oxynitride layers may be approximately linear as a function of time throughout the entirety of all layers 41, 43, and 45, or optionally may be curvilinear as a function of time throughout all of layers 41–45, or optionally may only vary as a function of time near the interfaces so that a substantial portion of each layer 41, 43, and 45 has a substantially constant x and/or y value and proximate the interface areas of these layers have x and/or y values that vary as a function of time. Further advantages include (6) $SiO_xN_y$ film can be deposited by other thin film deposition methods such as sputtering or vapor deposition; in the case of sputtering, for example, $SiO_x$ can be formed using at least $Si_3N_4$ in $O_2$ ambient plasma; and (7) Black matrix reflection can be optimized by varying refractive index, absorption coefficient, and the thickness of each silicon oxynitride layer.

In certain embodiments of this invention, each of layers 41, 43, and 45 is of silicon oxynitride, with first deposited layer 41 being from about 5 to 200 nm thick (preferably from about 70 to 90 nm thick, and most preferably about 80 nm thick), second deposited layer 43 being from about 5 to 500 nm thick (most preferably from about 40 to 200 nm), and third deposited layer 45 being from about 10 to 500 nm thick (preferably from about 30 to 70 nm thick, and most preferably about 50 nm thick). Although in FIG. 3 only three silicon oxynitride layers are illustrated, the number of such layers can be varied as low as two and as many as ten. In the FIG. 3 embodiment, fourth layer 47 may be of amorphous silicon (a-Si) or of a-Si rich silicon oxynitride. Amorphous silicon is a material which tends to absorb more light than do any of layers 41–45, although the absorption coefficient of layers 41–45 can be adjusted upward or downward by varying x and/or y in the silicon oxynitride. Absorption layer 47 may be from about 50 to 600 nm thick, preferably from about 200 to 300 nm thick. Overlying opaque metal layer 49 may be from about 100 to 1000 nm thick, preferably from about 200 to 600 nm thick, even more preferably from about 200 to 300 nm thick, and most preferably about 200 nm thick. Metal layer 49 may be of Mo, Cr, or any other suitable metal. Alternatively, layers 41–45 may be of a material other than silicon oxynitride that behaves in a similar manner and includes at least two subscript parameters that can be varied.

Ambient light 12 reaching the display proceeds through color filter substrate 7 and hits layers 41–45. Each of layers 41–45 provides some absorption of light, and their refractive indices minimize reflection off of system 3. Part of ambient light passes through silicon oxynitride layers 41–45 and reaches absorption layer 47 (e.g. of a-Si) and layer 49. Layer 47 functions to absorb a substantial amount of visible light which impinges thereon (e.g. more than about 60%, and preferably more than about 80%). For example, a-Si mostly absorbs blue and green visible light, but transmits small amounts of red light. The light which gets through layer 47 then hits opaque metal layer 49 which reflects some of such light. The reflected light again is mostly absorbed by a-Si layer 47 and further absorption of reflected rays is performed by layers 41–45. In such a manner, matrix system 3 appears substantially "black" in color to the naked eye and can achieve visible light reflection (e.g. including 550 nm light rays) of less than about 1.0%, preferably less than about 0.80%, more preferably less than about 0.60%, and most preferably less than about 0.40%, in certain embodiments.

The use of the term "black" in the matrix system of this invention does not mean that everything is purely black in color, but only that system 3 is substantially opaque to most visible wavelengths and reflects little light and functions in the typical black matrix manner as known in the art.

Figure 4:
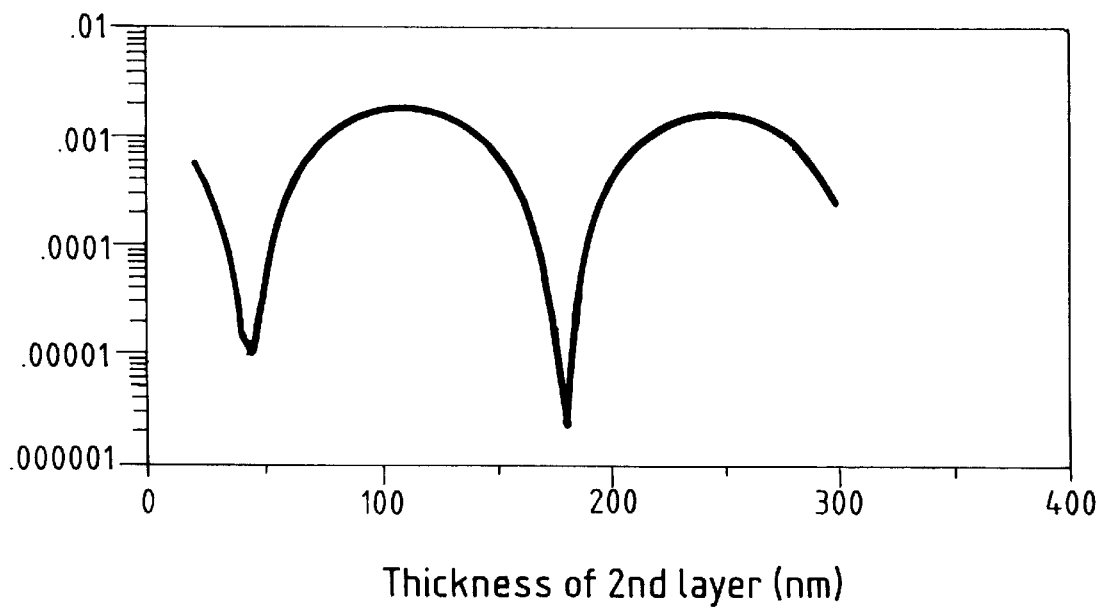
FIG. 4 is a graph of a black matrix exemplar system according to an embodiment of this invention, wherein the reflection of the system is plotted as a function of the thickness of the second $SiO_xN_y$ layer, while the thicknesses of the other layers remain constant.

Referring to FIGS. 3 and 4, examples of this invention, not intended to be limiting, were simulated using ambient light 12 having a wavelength of 550 nm. Firstly, substrate 7 was provided as shown in FIG. 3. Transparent substrate 7 had a refractive index "n" of 1.5, and a "k" value of 0 (i.e. n=1.5, k=0). The term "k" refers to the imaginary part of refractive index as known as extinction coefficient in the art, and may often be characterized by the following equation: $k = (\alpha \cdot \lambda)/4\Pi$ where $\alpha$ is the absorption coefficient and $\lambda$ is the wavelength. On substrate 7 were $SiO_xN_y$ layers 41, 43, and 45, with "x" and "y" of these layers being varied abruptly to achieve the below set forth "n" and "k" values. In an example of one embodiment, first layer 41 was 80 nm thick (n=1.7, k=0.05); second layer 43 had a different thickness in each example as will be described with respect to FIG. 4 (in all examples, in layer 43, n=2.0, k=0.05), and third layer 45 had a thickness of 50 nm (n=2.0, k=0.10).

Then, over layers 41–45, a-Si layer 47 is provided to a thickness of 250 nm (n=4.0, k=0.26), and thereafter metal layer 49 was formed over layer 47, with layer 49 being 200 nm thick (n=3.6, k=3.4).

This black matrix structure was then simulated with optical models at 550 nm wavelength as shown in FIG. 4, with the thickness of second layer 43 varying between about 15 nm and 300 nm. FIG. 4 plots the reflection characteristics of this black matrix 3 at different thicknesses of second silicon oxynitride layer 43 with the thicknesses of all other layers being held constant. FIG. 4 graphically shows black matrix 3 reflection versus the thickness (nm) of second layer 43. As can be seen, reflection % of less than about 0.20% can be achieved by system 3.

It will now be described how an LCD according to an embodiment of this invention is manufactured. Firstly, the active substrate is manufactured, including the TFTs and pixel electrodes thereon, as described and illustrated in U.S. Pat. No. 5,641,974. A second transparent, but passive, glass substrate 7 is provided. Silicon oxynitride layers 41, 43, and 45 are deposited directly on glass substrate 7 via PECVD in sheet form over substantially the entire surface of the substrate. The refractive index between layers 41, 43, and 45 can be changed between about 1.5 and 4.0 by varying "x" and/or "y" of $SiO_xN_y$ in each of these layers, this varying of x and/or y is done by changing the gas ratio of $SiH_4/NH_3/N_2O$ and possibly other gases in the PECVD process. The absorption coefficient of the silicon oxynitride can also be varied via x and/or y changes. Preferably, the index "n" of layer 41 is lower than that of layer 43, which in turn is lower than that of layer 45, whereby the refractive index of layer 43 is a value in between those of layers 41 and 45 where layer 41 is closest to the glass of the supporting substrate.

In gradual interface embodiments, layers 41, 43, and 45 are deposited via PECVD without stopping RF power in the CVD apparatus through the deposition of all three layers as the gas ratios (and thus x and y) change as a function of time (t). In abrupt interface embodiments, three layers 41, 43, and 45 are deposited so that at the interfaces between the layers, the RF power is stopped and the gas ratio is changed before depositing the next layer. Thus, layers 41–45 can be deposited totally separately with each such layer having its own unique substantially constant x and/or y values (abrupt embodiments), or alternatively can be deposited in one continuous CVD process while changing the gas ratios (gradual) so that x and y vary as a function of time. In certain embodiments of this invention, the silicon oxynitride layers 41–45 are deposited and x and y varied in these layers so that the delta of (or difference between) refractive index "n" values of immediately adjacent silicon oxynitride layers is not greater than about 1.0, and the k value delta of immediately adjacent silicon oxynitride layers is not greater than about 0.05. These minimal variations in refractive index and k throughout the black matrix system stack between glass substrate 7 and metal layer 49 minimize reflections. After layer 45 has been deposited, absorption layer 47 (e.g. a-Si) is deposited via PECVD to a thickness that is substantially greater than that of any of layers 41, 43, and 45.

After layers 41–47 have been deposited on substrate 7, this layering system is patterned (e.g. photoresist applied and etching thereafter) in order to form or pattern the layers 41–47 into the black matrix areas (e.g. between the pixels) to result. The silicon oxynitride layers 41–45 may be dry etched in F-based plasma in certain embodiments.

Layers 41–47 may all be etched in the same RIE chamber in certain embodiments at the same time. However, it is also possible to deposit only the silicon oxynitride layers 41–45, and etch them alone in F-based plasma, and thereafter deposit and etch a-Si layer 47 into the same pattern.

After such patterning of layers 41–47, metal layer 49 (e.g. Molybdenum) is deposited on substrate 7 in sheet form and patterned (e.g. photoresist and etching) into the same pattern as the underlying silicon oxynitride and a-Si layers 41–47. The result is the black matrix system 3 on substrate 7 (e.g. see FIG. 2).

An alternative approach is to pattern and etch layer 49 with layers 41–47 together.

After system 3 has been formed, color filters are deposited and patterned on the substrate over the black matrix (so that the color filters overlap the black matrix), and then a common electrode (e.g. ITO) and an orientation film are formed on substrate 7 over the black matrix.

Optionally, additional silicon oxynitride layer(s) can be deposited over layer 45, and in other embodiments, only one or two silicon oxynitride layer(s) may be used on substrate 7. For example, four or more (e.g. up to about 10–50 depending upon reflection requirements) silicon oxynitride layers could be used in certain embodiments, or only one or two such layers could be used in other embodiments. Still further, silicon oxynitride layers may be positioned between metal layer 49 and a-Si layer 47 to improve performance of the black matrix system.

By minimizing change of refractive indices "n" between immediately adjacent black matrix layers by varying x and y in the silicon oxynitride, the first layer 41 can have a refractive index n substantially matched to glass substrate 17 (e.g. 1.5 to 1.7 vs. 1.5); while second layer 43 has a slightly higher refractive index n (e.g. from about 1.7–2.0) that substantially matches that of layer 41; while third layer 45 has a slightly higher refractive index n (e.g. about 3.0) that is relatively close to that of layer 43 and layer 47; and finally a-Si layer 47 is deposited so that its refractive index differs from that of the adjacent layer 45 by no more than about 1.4, preferably no more than about 1.0. Metal layer 49 is deposited over layer 47 so that its refractive index substantially matches that of layer 47. Because the refractive index of layers 41–45 can be changed gradually through the deposition process, there are no truly severe differences in refractive index between adjacent layers in system 3, so that reflections are minimized. In certain embodiments, the refractive index of adjacent layers in matrix 3 does not vary by more than about 1.0 (i.e. $\Delta n$ is less than or equal to about 1.0 for immediately adjacent layers in system 3), and the "k" value of adjacent silicon oxynitride layers in matrix 3 does not vary by more than about 0.15 (i.e. $\Delta k$ is less than or equal to about 0.15 for immediately adjacent silicon oxynitride layers). The wide range of refractive index values n of silicon oxynitride that can be achieved with PECVD, and gas changes therein, reduces differences ($\Delta$) between adjacent refractive index values in system 3, thereby minimizing reflections.

In view of the above, it is clear that the black matrix systems according to different embodiments of this invention are made by depositing at least two, and preferably at least three separate layers/portions of $AB_xC_y$ successively, where A, B, and C are chemical elements, and where "x" and/or "y" are varied from layer/portion to layer/portion in order to cause each layer/portion of $AB_xC_x$ to have a different refractive index "n" and a different "k" value. Preferably, x and y are varied so that the refractive index of the $AB_xC_y$ layer/portion immediately adjacent the glass of the substrate is from about 1.5 to 1.7 and thus substantially matches that of the glass, and where the refractive index of the $AB_xC_y$ layers/portions increases as a function of distance away from the substrate so that when further and different absorption layers and/or metal layer(s) are deposited there is not an overly large difference in refractive index created. In certain preferred embodiments of this invention A=Si, B=0, and C=N, although it is envisioned that other materials can be used.

Varying n and k of different silicon oxynitride layers, sometimes in combination with varying the thickness(es) of any or all of such layers enables very low ambient reflections less than or equal to about 1% in the visible 380–760 nm wavelength range. Optimizing both thickness and (n, k) of each silicon oxynitride layer enables minimal reflections less than or equal to about 1% to be achieved.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A liquid crystal display comprising:
   an active substrate including a plurality of switching devices thereon;
   a passive substrate including a common electrode thereon;
   a liquid crystal layer disposed between said active and passive substrates;
   a black matrix system disposed on said passive substrate, said black matrix system including at least one $SiO_xN_y$ layer having a thickness, wherein "x" and "y" of said $SiO_xN_y$ each substantially vary throughout the black matrix system.

2. The display of claim 1, wherein said "x" and "y" in said at least one $SiO_xN_y$ layer vary in a manner so that the refractive index of said at least one $SiO_xN_y$ layer varies within the range of from about 1.5 to 4.5.

3. The display of claim 1, wherein first, second, and third $SiO_xN_y$ layers are provided in said black matrix system, with said first $SiO_xN_y$ layer being positioned adjacent said passive substrate, and said second $SiO_xN_y$ layer being located between said first and third $SiO_xN_y$ layers.

4. The display of claim 3, wherein each of said first, second, and third $SiO_xN_y$ layers has a different refractive index "n" and a different "k" value.

5. The display of claim 4, wherein the refractive index "n" of said first $SiO_xN_y$ layer is from about 1.5 to 1.7, the refractive index "n" of said second $SiO_xN_y$ layer is from about 1.75 to 2.50, and the refractive index of said third $SiO_xN_y$ layer is from about 2.50 to 3.50.

6. The display of claim 4, wherein the "k" value of said first and second $SiO_xN_y$ layers are between 0 and 0.20.

7. The display of claim 1, wherein refractive indices of adjacent $SiO_xN_y$ layers are different from one another by no more than about 1.0.

8. The display of claim 1, wherein said black matrix system includes first and second $SiO_xN_y$ layer portions each having a different refractive index and a different "k" value, and wherein said black matrix system further includes a metal layer disposed on said passive substrate such that said second $SiO_xN_y$ layer is located between said first $SiO_xN_y$ layer and said metal layer.

9. The display of claim 8, wherein said second $SiO_xN_y$ layer is from about 5 to 500 nm thick, and said metal layer is from about 100 to 1,000 nm thick.

10. The display of claim 9, further including an a-Si layer disposed underneath said metal layer.

11. The display of claim 1, wherein said black matrix system reflects less than about 1.0% of visible light rays impinging thereon.

12. The display of claim 1, wherein said black matrix system reflects less than about 0.80% of visible light rays of 550 nm.

13. The display of claim 11, wherein said black matrix system reflects less than about 0.40% of visible light rays.

14. A liquid crystal display comprising:
   first and second substrates;
   a liquid crystal layer disposed between said first and second substrates;
   a black matrix system disposed on one of said first and second substrates, so that an interface is defined between said black matrix system and said one of said first and second substrates;
   said black matrix system reflecting less than about 1.0% of ambient visible light rays;
   said black matrix system having a first index of refraction of from about 1.5 to 1.7 immediately adjacent said interface, and said substrate having a second index of refraction of from about 1.4 to 1.6 immediately adjacent said interface; and
   wherein said black matrix system includes a material having at least two parameters that vary in said black matrix system in order to vary the index of refraction of said material in said system.

15. The display of claim 14, wherein said material includes silicon oxynitride.

16. A method of making a display comprising the steps of:
   providing a substantially transparent substrate;
   forming a black matrix structure on the substrate by performing at least the following steps:
   a) depositing a first layer or portion on the substrate, the first layer or portion including first, second, and third chemical elements with the first layer or portion including a first amount of the first element, a first amount of the second element, and a first amount of the third element;
   b) depositing a second layer or portion, including the first, second, and third chemical elements, on the substrate so that the first layer or portion is located between the substrate and the second layer or portion, the second layer or portion including a second amount of the second chemical element and a second amount of the third chemical element so that the second layer or portion has a higher refractive index value than the first layer or portion, and the second amounts are different than the first amounts; and
   c) providing a third layer on the substrate, the third layer having a refractive index value greater than the first and second layers/portions.

17. The method of claim 16, wherein the third layer is a metal layer, and wherein the first chemical element is silicon, the second chemical element is oxygen, and the third chemical element is nitrogen.

18. The method of claim 17, wherein the first and second layers/portions include silicon oxynitride, and the method further including the step of depositing another silicon oxynitride layer that is positioned in between said metal layer and said second layer.

19. The method of claim 16, further including varying gas ratios in a vapor deposition apparatus in order to vary amounts of the second and third chemical elements from the first layer to the second layer.

20. The method of claim 16, wherein said A, B, and C are said first, second, and third chemical elements, respectively, and wherein said first and second layers/portions are of $AB_xC_y$, and wherein x and y are varied in order to change the amounts the B and C elements in the first and second layers/portions; and varying gas ratios in a vapor deposition apparatus in order to cause x and y to be different in said second layer/portion than in said first layer/portion so that said second layer/portion has a higher refractive index than said first layer/portion.

21. The method of claim 16, wherein the first and second layers include silicon oxynitride, and the method further comprising the steps of forming the silicon oxynitride layers using plasma enhanced chemical vapor deposition (PECVD) by varying any combination of $SiH_4/NH_3/N_2O/H_2/N_2/O_2$ gas ratios.

22. The method of claim 16, wherein the first and second layers include silicon oxynitride, and the method further comprising the step of forming the silicon oxynitride layers by one of sputtering and evaporation.

* * * * *